United States Patent
Baba et al.

(10) Patent No.: US 8,512,898 B2
(45) Date of Patent: Aug. 20, 2013

(54) SEPARATOR FOR NONAQUEOUS ELECTROLYTE BATTERY AND NONAQUEOUS ELECTROLYTE BATTERY

(75) Inventors: Yasunori Baba, Plano, TX (US); Naoki Imachi, Kobe (JP); Atsushi Nakajima, Aichi (JP); Michihiko Irie, Otsu (JP); Masanori Nakamura, Otsu (JP)

(73) Assignees: SANYO Electronics Co., Ltd., Moriguchi-shi, Osaka (JP); TORAY Industries, Inc., Tokyo (JP)

( * ) Notice: Subject to any disclaimer, the term of this patent is extended or adjusted under 35 U.S.C. 154(b) by 635 days.

(21) Appl. No.: 12/680,370

(22) PCT Filed: Sep. 22, 2008

(86) PCT No.: PCT/JP2008/067112
§ 371 (c)(1),
(2), (4) Date: Mar. 26, 2010

(87) PCT Pub. No.: WO2009/041394
PCT Pub. Date: Apr. 2, 2009

(65) Prior Publication Data
US 2010/0233547 A1 Sep. 16, 2010

(30) Foreign Application Priority Data
Sep. 27, 2007 (JP) .................................. 2007-251966

(51) Int. Cl.
*H01M 2/16* (2006.01)
(52) U.S. Cl.
USPC ........... 429/251; 429/247; 429/249; 429/254; 429/129

(58) Field of Classification Search
USPC .......................... 429/129, 247, 249, 251, 254
See application file for complete search history.

(56) References Cited

U.S. PATENT DOCUMENTS

| 6,447,958 B1 * | 9/2002 | Shinohara et al. ............ 429/248 |
| 2007/0190404 A1 | 8/2007 | Hatanaka et al. |

FOREIGN PATENT DOCUMENTS

| JP | 10-6453 A | 1/1998 |
| JP | 10-324758 A | 12/1998 |
| JP | 2000-100408 A | 4/2000 |
| JP | 2001-266949 A | 9/2001 |
| JP | 2005-294139 A | 10/2005 |
| JP | 2006-147191 A | 6/2006 |
| JP | 2006147191 A * | 6/2006 |

(Continued)

OTHER PUBLICATIONS

International Search Report of PCT/JP2008/067112, mailing date of Jan. 20, 2009.

*Primary Examiner* — Basia Ridley
*Assistant Examiner* — Heng Chan
(74) *Attorney, Agent, or Firm* — Westerman, Hattori, Daniels & Adrian, LLP

(57) ABSTRACT

To obtain a separator for a nonaqueous electrolyte battery that has an excellent nonaqueous electrolyte permeability into an electrode and an excellent electrolyte retentivity of the electrode and achieves a large capacity, a high energy density and a good high-temperature charge characteristic. A separator 3 used for a nonaqueous electrolyte battery is formed by disposing a porous layer 2 made of inorganic fine particles and a resin binder on a porous separator substrate 1, the resin binder is made of at least one resin selected from the group consisting of polyimide resins, polyamide resins and polyamideimide resins and the molecular chain of the resin has a halogen atom content of 10% to 30% by weight, and the content of the resin binder in the porous layer is 5% by weight or more.

6 Claims, 1 Drawing Sheet

(56) References Cited

FOREIGN PATENT DOCUMENTS

| | | |
|---|---|---|
| JP | 2007-95575 A | 4/2007 |
| JP | 2007-123237 A | 5/2007 |
| JP | 2007-123238 A | 5/2007 |
| JP | 2007-200795 A | 8/2007 |
| JP | 2007-204518 A | 8/2007 |
| JP | 2007204518 A * | 8/2007 |
| WO | 2006/068428 A1 | 6/2006 |
| WO | 2006/134833 A1 | 12/2006 |

* cited by examiner

SEPARATOR FOR NONAQUEOUS ELECTROLYTE BATTERY AND NONAQUEOUS ELECTROLYTE BATTERY

TECHNICAL FIELD

This invention relates to separators used for nonaqueous electrolyte batteries, such as lithium ion secondary batteries and polymer secondary batteries, and relates to nonaqueous electrolyte batteries using the separators.

BACKGROUND ART

In recent years, size and weight reduction of mobile information terminals, such as cellular phones, notebook computers and PDAs, has rapidly progressed. Batteries serving as their driving power sources are being required to achieve a much higher capacity. Among various types of secondary batteries, lithium ion batteries having particularly high energy densities have increased the capacity over the years, but under the existing conditions cannot fully respond to the above requirement. In addition, recently, the application of lithium ion batteries has been expanded beyond mobile information terminals, such as cellular phones, to serve as middle to large size batteries for electric tools, electric cars or hybrid cars by taking advantage of their features. Thus, there has been a tremendous increase in the demand for further increasing the capacity and power of lithium ion batteries.

There has recently been disclosed a technique of increasing the capacity and power of a battery by increasing the end-of-charge voltage from 4.1-4.2 V (4.2-4.3 V as a voltage versus the potential of a lithium reference electrode (vs. Li/Li$^+$)) that would conventionally be used to 4.3 V or more (4.4 V (vs. Li/Li$^+$) or more) to increase the utilization factor of the positive electrode (see Patent Document 1).

For the purpose of increasing the battery capacity, consideration has been made of high-density packing of electrode material, thickness reduction of a current collector, a separator or a battery housing that are members uninvolved in power generation factors, and other measures. On the other hand, for the purpose of increasing the battery power, consideration has been made of increasing the electrode area, and other measures. In terms of battery construction, challenges of electrolyte permeability into each electrode and electrolyte retentivity of the electrode are being given more attention today than in the early days of development of lithium ion batteries. It has become necessary, in establishing a novel battery construction, to solve the problems as thus far described in order to ensure the battery performance and reliability.

A technique is disclosed in which, in order to solve the above problems, a porous layer having an excellent nonaqueous electrolyte permeability is disposed between at least one of the positive and negative electrodes and a separator and allowed to function as a diffusion path for supplying an electrolytic solution present in a remaining space of the battery to the interior of the electrode, thereby improving the battery characteristics (see Patent Documents 2 and 3). When the positive electrode is charged to above 4.40 V versus the potential of a lithium reference electrode, the electrolytic solution may be likely to be oxidatively decomposed to largely reduce the amount of electrolytic solution in the battery. The above technique acts more effectively under such a condition and, therefore, is a useful technique for increasing the capacity and power of a battery.

The inventors have considered, as a porous layer to be disposed between at least one of positive and negative electrodes and a separator, a porous layer made of inorganic fine particles and a resin binder, and have considered, as the resin binder, polyamide, polyimide, polyamideimide or like resin.

Techniques using polyamide, polyimide, polyamideimide or like resin for a separator have already been considered for the purpose of increasing the heat resistance (see Patent Documents 4 to 7). In these conventional techniques, however, the resins have been considered simply focusing on improving the safety.

Patent Document 1: Published Japanese Patent Application No. 2006-147191
Patent Document 2: Published Japanese Patent Application No. 2007-123237
Patent Document 3: Published Japanese Patent Application No. 2007-123238
Patent Document 4: Published Japanese Patent Application No. H10-6453
Patent Document 5: Published Japanese Patent Application No. H10-324758
Patent Document 6: Published Japanese Patent Application No. 2000-100408
Patent Document 7: Published Japanese Patent Application No. 2001-266949

DISCLOSURE OF THE INVENTION

If an organic solvent is used in order to dissolve polyamide, polyimide, polyamideimide or like resin, the organic solvent may cause a problem in that it will dissolve poly(vinylidene fluoride) (PVdF) used as a binder for a positive electrode. Therefore, in disposing a porous layer between an electrode and a separator, the porous layer cannot be placed on the surface of a positive electrode and must be placed on the surface of the separator facing the positive electrode. If the porous layer is placed on the positive electrode side of the separator in this manner, this may cause a problem in that when the battery voltage is above 4.30 V (above 4.40 V (vs. Li/Li$^+$)), the high-temperature charge characteristic of the battery may be largely deteriorated. It can be assumed that the reason for this is that when the potential of the positive electrode is above 4.40V (vs. Li/Li$^+$), the resin such as polyamide, polyimide or polyamideimide in the porous layer adjacent to the positive electrode surface is oxidatively decomposed and a reaction product derived from the oxidative decomposition has an adverse effect on intercalation reaction of lithium in the interior of the battery.

An object of the present invention is to provide a separator for a nonaqueous electrolyte battery that has an excellent nonaqueous electrolyte permeability into an electrode and an excellent electrolyte retentivity of the electrode and achieves a large capacity, a high energy density and a good high-temperature charge characteristic, and provide a nonaqueous electrolyte battery using the separator.

The present invention is directed to a separator used for a nonaqueous electrolyte battery, wherein the separator is formed by disposing a porous layer made of inorganic fine particles and a resin binder on a porous separator substrate, the resin binder is made of at least one resin selected from the group consisting of polyimide resins, polyamide resins and polyamideimide resins and the molecular chain of the resin has a halogen atom content of 10% to 30% by weight, and the content of the resin binder in the porous layer is 5% by weight or more.

The resin materials, such as polyamide, polyimide and polyamideimide, are required to be dissolved in an organic solvent in forming a film therefrom. Generally known as a method for improving the solubility of a polyimide resin is a method of introducing alkyl bonds or ether bonds into the polyimide resin. However, these bonds are poor in resistance to electrophilic reaction, and polyimide resins tend to be oxidatively decomposed when used in the vicinity of the positive electrode. Polyamide resins and polyamideimide resins superior in solubility to polyimide tend to be likewise oxidized by abstraction of hydrogen atoms from amide bonds when the battery voltage is above 4.30 V (above 4.40 V (vs. Li/Li$^+$)). Therefore, in order to improve the high-temperature charge characteristic when the battery voltage is above 4.30 V (above 4.40 V (vs. Li/Li$^+$)), the molecular structure of the polyamide resin, polyimide resin or polyamideimide resin used must be made stable to oxidation reaction.

In the present invention, what is used as the resin binder in the porous layer is at least one resin which is selected from the group consisting of polyimide resins, polyamide resins and polyamideimide resins and the molecular chain of which has a halogen atom content of 10% to 30% by weight. Since the content of halogen atoms in the molecular chain is 10% to 30% by weight, the electron density of the main chain of the resin can sufficiently be reduced to reduce the oxidation of the resin and thereby increase the high-temperature charge characteristic.

If the halogen atom content is less than 10% by weight, the electron density of the main chain of the resin cannot sufficiently be reduced. This makes the resin likely to be oxidized and thereby makes it impossible to achieve a good high-temperature charge characteristic. On the other hand, if the halogen content is over 30% by weight, this increases the thixotropy of the resin solution for forming a porous layer to reduce the uniform dispersion of inorganic fine particles and the porosity of the porous layer, which is undesirable.

Particularly preferred halogen atoms to be contained in the main chain are fluorine atoms because the higher the electronegativity is, the more the electron density of the resin main chain can be reduced and the more the electron abstraction reaction due to oxidation can be reduced.

The inorganic fine particles to be used in the porous layer in the present invention are not particularly limited so long as they are fine particles made of an inorganic material. For example, inorganic materials that can be used are titania (titanium oxide), alumina (aluminum oxide), zirconia (zirconium oxide), and magnesia (magnesium oxide). A tinania to be particularly preferably used is one having a rutile structure.

Considering the dispersibility in slurry, inorganic fine particles whose surfaces are treated with an oxide of Al, Si, Ti or the like can be preferably used. Considering the stability in the interior of the battery (reactivity with lithium) and cost, fine particles of alumina or rutile-structure titania can be preferably used as inorganic fine particles to be used in the present invention.

The average particle size of the inorganic fine particles in the present invention is preferably 1 μm or less. It can be assumed that if the average particle size of the inorganic fine particles is larger than the average pore size of the porous separator substrate, the inorganic fine particles hardly enter the interior of the separator substrate. On the other hand, if the average particle size of the inorganic fine particles is smaller than the average pore size of the porous separator substrate, the inorganic fine particles may enter the interior of the separator. If the inorganic fine particles enter the interior of the separator substrate, pores in the interior of the separator may be partly passed through when the separator undergoes winding tension in producing a battery or is processed into a flattened shape after the winding, whereby small-resistance sites may be formed in the separator to cause a battery defect. Therefore, the average particle size of the inorganic fine particles is preferably larger than the average pore size of the porous separator substrate. Specifically, the average particle size of the inorganic fine particles is generally preferably within the range of 0.2 to 1.0 μm.

The polyamide resins, polyimide resins and polyamideimide resins in the present invention are resins that can be obtained by reacting an acid component with a base component.

Examples of the acid component include not only trimellitic acid, its anhydride and its acid chloride but also tetracarboxylic acids and their anhydrides including pyromellitic acid, biphenyltetracarboxylic acid, biphenylsulfonetetracarboxylic acid, benzophenonetetracarboxylic acid, biphenylethertetracarboxylic acid, ethylene glycol bis(anhydrotrimellitate), propylene glycol bis(anhydrotrimellitate) and propylene glycol bis(anhydrotrimellitate), aromatic dicarboxylic acids including terephthalic acid, isophthalic acid, diphenylsulfonedicarboxylic acid, diphenyletherdicarboxylic acid and naphthalenedicarboxylic acid, their anhydrides, compounds of fluorine-containing acids including tetrafluorosuccinic acid, hexafluoroglutaric acid, octafluoroadipic acid, perfluorosuberic acid, perfluoroazelaic acid, 2,2-bis(3,4-carboxyphenyl)hexafluoropropane, 2,2'-bis(trifluoromethyl)-4,4',5,5'-phenyltetracarboxylic acid, 4,4'-(hexafluorotrimethylene)-diphthalic acid and 4,4'-(octafluorotetramethylene)-diphthalic acid, and their anhydrides.

An example of the method of introducing halogen atoms into the resin molecular chain is a method using an acid component or base component containing halogen atoms in the molecular chain. If fluorine atoms are introduced as halogen atoms, examples of the acid component for introducing fluorine atoms include fluorine-containing acid compounds, such as 2,2-bis(3,4-carboxyphenyl) hexafluoropropane dianhydride. Using such an acid component, the resin, which is a product, can be increased in heat resistance and stability to charge-discharge reaction.

The content of the acid component for introducing halogen atoms is preferably within the range of 30% to 100% by mole of the total amount of all of acid components, more preferably within the range of 50% to 100% by mole, and still more preferably within the range of 70% to 100% by mole.

Examples of the base component include aromatic diamines, such as m-phenylenediamine, p-phenylenediamine, 4,4'-diaminodiphenylmethane, 4,4'-diaminodiphenylether, 4,4'-diaminodiphenylsulfone, benzine, o-tolidine, 2,4-tolylenediamine, 2,6-tolylenediamine, xylylenediamine and naphthalenediamine, and their diisocyanates.

An example of the method of introducing halogen atoms into the resin molecular chain is a method using a base component containing halogen atoms, as described above. In using fluorine atoms as halogen atoms, examples of the base component containing fluorine atoms include 2,2-bis(4-aminophenyl) hexafluoropropane, 2,2'-bis(trifluoromethyl)-4,4'-diaminobiphenyl, 2,2-bis[4-(4-aminophenoxy)phenyl] hexafluoropropane, 2-trifluoromethyl-p-phenylenediamine, and their diisocyanates. In terms of the heat resistance and stability to charge-discharge reaction of the product, i.e., the resin, 2-trifluoromethyl-p-phenylenediamine diisocyanate can be preferably used.

The content of the base component for introducing halogen atoms is preferably within the range of 30% to 100% by mole of the total amount of all of base components, more preferably within the range of 50% to 100% by mole, and still more preferably within the range of 70% to 100% by mole.

The resin binder in the present invention is preferably selected in consideration of (1) whether it ensures the dispersibility of inorganic fine particles (whether it can prevent reaggregation of inorganic fine particles), (2) whether it has an adhesion capable of withstanding a battery production process, (3) whether it can fill in clearances between inorganic fine particles created by swelling after absorption of the electrolytic solution, and (4) whether it can be less eluted into the electrolytic solution.

The content of the resin binder in the porous layer in the present invention is preferably 5% by weight or more, and more preferably within the range of 5% to 15% by weight. If the resin binder content is too small, this may cause a reduction in the strength of adhesion to inorganic fine particles and a reduction in the dispersibility of inorganic fine particles in a slurry for forming the porous layer. On the other hand, if the resin binder content is too large, this may reduce the air permeability in the porous layer, reduce the air permeability as a separator and in turn reduce the load characteristic of the battery.

The porous layer in the present invention can be formed by applying a slurry containing inorganic fine particles and a resin binder on a porous separator substrate and then drying the slurry.

The solvent to be used for the slurry containing inorganic fine particles and a resin binder is not particularly limited, and may be any solvent that can dissolve the resin binder. Examples of the solvent include N,N-dimethylacetamide (DMAc), N-methyl-2-pyrrolidone (NMP), hexamethyltriamide phosphate (HMPA), N,N-dimethylformamide (DMF), dimethylsulfoxide (DMSO) and γ-butylolactone (γ-BL).

The thickness of the porous layer in the present invention is not particularly limited, but is preferably within the range of 0.5 to 4 μm and more preferably within the range of 0.5 to 2 μm. The porous layer may be provided only on one surface of the porous separator substrate or may be provided on both surfaces thereof. If the porous layer is provided on both surfaces of the substrate, the above preferable thickness range is the thickness range for each surface of the substrate. If the thickness of the porous layer is too small, this may reduce the nonaqueous electrolyte permeability into the electrode and the electrolyte retentivity of the electrode. On the other hand, if the thickness of the porous layer is too large, this may reduce the load characteristic and energy density of the battery.

The air permeability of the separator obtained by disposing a porous layer on a porous separator substrate is preferably not more than twice that of the porous separator substrate, more preferably not more than 1.5 times that of the porous separator substrate, and still more preferably not more than 1.25 times that of the porous separator substrate. If the air permeability of the separator is much higher than that of the porous separator substrate, this may make the load characteristic of the battery too large.

Materials that can be used as the porous separator substrate in the present invention are porous films made of polyolefin, such as polyethylene or polypropylene. For example, separators as conventionally used for nonaqueous electrolyte secondary batteries can be used. For example, the thickness of the porous separator substrate is preferably within the range of 5 to 30 μm, the porosity thereof is preferably within the range of 30% to 60%, and the air permeability thereof is preferably within the range of 50 to 400 seconds per 100 ml.

A nonaqueous electrolyte battery according to the present invention includes a positive electrode, a negative electrode, a separator disposed between the positive and negative electrodes, and a nonaqueous electrolyte, wherein the separator is the previously described separator according to the present invention.

Since the nonaqueous electrolyte battery according to the present invention uses the separator according to the present invention, it can have an excellent nonaqueous electrolyte permeability into the electrode and an excellent electrolyte retentivity of the electrode and achieve a large capacity, a high energy density and a good high-temperature charge characteristic.

The porous layer in the present invention is, as described previously, a porous layer in which a resin binder is less likely to be oxidatively decomposed even if the potential of the positive electrode is above 4.40 V (vs. Li/Li$^+$). Therefore, if the porous layer is disposed on the positive electrode side of the porous separator substrate, the above effects of the invention are particularly pronounced.

Furthermore, in nonaqueous electrolyte secondary batteries whose positive electrodes have an end-of-charge voltage of above 4.40 V (vs. Li/Li$^+$), the above effects of the invention are more pronounced. Therefore, the nonaqueous electrolyte secondary battery according to the present invention is preferably a nonaqueous electrolyte secondary battery whose positive electrode is capable of being charged to above 4.40 V (vs. Li/Li$^+$).

The nonaqueous electrolyte battery according to the present invention may be a primary battery but is preferably a nonaqueous electrolyte secondary battery.

The positive electrode in the present invention is not particularly limited so long as it is a positive electrode used in a nonaqueous electrolyte battery. Examples of an active material for the positive electrode include lithium cobaltate, lithium-nickel composite oxides, such as lithium nickelate, lithium-transition metal composite oxides as represented by $LiNi_xCo_yMn_zO_2$ (x+y+z=1), and olivine phosphate compounds.

The negative electrode that can be used in the present invention is not limited so long as it can be used as a negative electrode for a nonaqueous electrolyte battery. Examples of an active material for the negative electrode include carbon materials, such as graphite and coke, tin oxide, metal lithium, and metals capable of forming an alloy with lithium, such as silicon.

The nonaqueous electrolyte in the present invention is not particularly limited so long as it can be used for nonaqueous electrolyte batteries. Examples of a lithium salt in the electrolyte include $LiBF_4$, $LiPF_6$, $LiN(SO_2CF_3)_2$, $LiN(SO_2C_2F_5)_2$, and $LiPF_{6-x}(C_nF_{2n+1})_x$ where $1<x<6$ and n=1 or 2. One of these materials or a mixture of two or more of them can be used as the lithium salt. The concentration of the lithium salt is not particularly limited but is preferably approximately 0.8 to approximately 1.5 mol/l.

Preferred solvents to be used for the nonaqueous electrolyte are carbonate solvents, such as ethylene carbonate (EC), propylene carbonate (PC), γ-butylolactone (γ-BL), diethyl carbonate (DEC), ethyl methyl carbonate (EMC) and dimethyl carbonate (DMC). More preferred solvents to be used are mixed solvents made of a cyclic carbonate and a chain carbonate.

The nonaqueous electrolyte in the present invention may be an electrolytic solution or a gel polymer. Examples of the polymer material include solid electrolytes including polyether solid polymers, polycarbonate solid polymers, polyacrylonitrile solid polymers, oxetane polymers, epoxy polymers, copolymers made of two or more of them, and their crosslinked polymers.

EFFECTS OF THE INVENTION

According to the present invention, since the resin binder used is at least one resin which is selected from the group consisting of polyimide resins, polyamide resins and polyamideimide resins and the molecular chain of which has a halogen atom content of 10% to 30% by weight, the electron density of the resin main chain can be reduced and the electron abstraction reaction due to oxidation can be reduced. Therefore, a nonaqueous electrolyte battery having a good high-temperature charge characteristic can be obtained.

Since the separator according to the present invention is formed by disposing a porous layer made of inorganic fine particles and a resin binder on a porous separator substrate, a nonaqueous electrolyte battery can be provided that has an excellent nonaqueous electrolyte permeability into an electrode and an excellent electrolyte retentivity of the electrode and achieves a large capacity and a high energy density.

Figure 1:
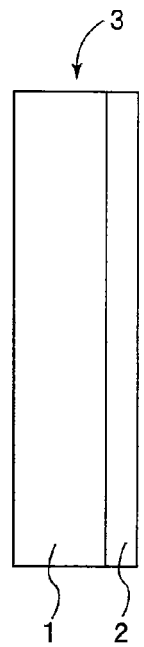
FIG. 1 is a schematic cross-sectional view showing a separator according to the present invention.

LIST OF REFERENCE NUMERALS 1 porous separator substrate
2 porous layer
3 separator

BEST MODE FOR CARRYING OUT THE INVENTION

Hereinafter, the present invention will be described in more detail with reference to the following Examples. However, the present invention is not at all limited by the following Examples, and can be embodied in various other forms appropriately modified without changing the spirit of the invention.

Evaluation in Formation of Porous Layer

Example A1

Production of Separator

Synthesis of Fluorine-Containing Resin

In a four-necked flask provided with a condenser and a nitrogen gas inlet, 1.0 mol of 2,2-bis(3,4-dicarboxyphenyl) hexafluoropropane dianhydride and 0.95 mol of o-tolidine diisocyanate were mixed with N-methyl-2-pyrrolidone (NMP) to give a solid content concentration of 20% by weight, and 0.01 mol of diazabicycloundecene was added as a catalyst to the mixture. The mixture was stirred and allowed to react at 120° C. for four hours.

The solvent-soluble polyimide resin thus obtained had a solid content concentration of 20% by weight and a logarithmic viscosity of 0.7 g/dl, and the content of fluorine atoms in the resin was 18% by weight.

Preparation of Application Liquid

Next mixed were 10 parts by weight of the obtained solvent-soluble polyimide resin solution (solid content: 20% by weight), 12 parts by weight of polyethylene glycol (trade name "PEG-400", manufactured by Sanyo Chemical Industries, Ltd.), 40 parts by weight of NMP and 38 parts by weight of titanium oxide (trade name "KR-380", manufactured by Titan Kogyo, Ltd., average particle size: 0.38 μm). The mixture was put into a container made of polypropylene, together with zirconium oxide beads (trade name "Torayceram Beads", manufactured by Toray Industries, Inc., diameter: 0.5 mm), followed by allowing the inorganic fine particles to be dispersed with a paint shaker (manufactured by Toyo Seiki Seisaku-sho, Ltd.) for six hours.

The obtained dispersion was filtered through a filter having a filtration limit of 5 μm, thereby obtaining an application liquid A1.

Film Formation (Production of Separator)

A piece of porous polyethylene film (thickness: 16 μm, porosity: 51%, average pore size: 0.15 μm, air permeability: 80 seconds per 100 ml) was put as a porous separator substrate on a corona-treated surface of a sheet of propylene film (trade name "PYLEN-OT", manufactured by Toyobo Co., Ltd.). The above application liquid A1 was applied on the piece of porous polyethylene film with the clearance set at 10 μm. After the application, the polyethylene film piece was passed through an atmosphere at a temperature of 25° C. and a relative humidity of 40% in 20 seconds, then immersed in a water bath, then picked up from the water path, then dried at 70° C. by hot air, thereby producing a separator.

FIG. 1 is a schematic cross-sectional view showing the obtained separator. As shown in FIG. 1, the separator 3 includes a porous layer 2 formed by applying the application liquid A1 on the porous separator substrate 1.

The thickness of the obtained separator was 18 μm. Therefore, the thickness of the porous layer was 2 μm. The air permeability of the obtained separator was 100 seconds per 100 ml, which is 1.25 times that of the porous separator substrate. The ratio of polyimide resin to titanium oxide in the porous layer is 5 parts by weight to 95 parts by weight.

The logarithmic viscosity and solid content concentration of the polyimide resin solution, the fluorine content in the polyimide resin and the air permeability and thickness of the separator were measured in the following manners.

(Logarithmic Viscosity [dl/g])

A solution of 0.5 g of the polymer dissolved in 100 ml of NMP was measured in terms of viscosity at 25° C. with an Ubbelohde viscosimeter.

(Solid Content Concentration [%])

Approximately 1.0 g of the resin solution was dripped on a piece of aluminum foil and dried in vacuum at 250° C. for 12 hours. The solid obtained after the drying was measured in terms of weight. The solid content concentration was obtained according to the following equation:

Solid Content Concentration[%]=(Weight of Solid After Drying[g])/(Weight of Resin Solution Before Drying[g])×100(Fluorine Content[%])

The content of fluorine atoms in the resin was determined by elementary analysis measurement or fluorescence X-ray analysis measurement.

(Air Permeability [sec/100 ml])

The air permeability was measured according to JIS (Japanese Industrial Standards) P-8117 using a Gurley type Densometer Model B manufactured by Tester Sangyo Co., Ltd. The measurement was conducted five times. The average of the measured values was employed as the air permeability [sec/100 ml].

(Thickness [μm])

The thickness was measured using a contact type film thickness meter (trade name "μ-mate M-30", manufactured by Sony Corporation).

Example A2

A separator was produced in the same manner as in Example A1 except that the polyimide resin and titanium oxide were mixed to give a ratio of 10 parts by weight of polyimide resin to 90 parts by weight of titanium oxide in the porous layer.

Example A3

A separator was produced in the same manner as in Example A1 except that the polyimide resin and titanium oxide were mixed to give a ratio of 15 parts by weight of polyimide resin to 85 parts by weight of titanium oxide in the porous layer.

Comparative Example W1

A separator was produced in the same manner as in Example A1 except that the polyimide resin and titanium oxide were mixed to give a ratio of 4 parts by weight of polyimide resin to 96 parts by weight of titanium oxide in the porous layer.

Comparative Example W2

A separator was produced in the same manner as in Example A1 except that the polyimide resin and titanium oxide were mixed to give a ratio of 3 parts by weight of polyimide resin to 97 parts by weight of titanium oxide in the porous layer.

Comparative Example W3

Synthesis of Fluorine-Containing Resin

In a four-necked flask provided with a condenser and a nitrogen gas inlet, 1.0 mol of tetrafluorosuccinic acid and 1.0 mol of 2-trifluoromethyl-p-phenylene diisocyanate were mixed with NMP to give a solid content concentration of 20% by weight, and 0.01 mol of diazabicycloundecene was added as a catalyst to the mixture. The mixture was stirred in the flask and allowed to react at 120° C. for about four hours.

The solvent-soluble polyamide resin thus obtained had a solid content concentration of 20% by weight and a logarithmic viscosity of 0.7 g/dl, and the content of fluorine atoms in the resin was 38% by weight.

Preparation of Application Liquid

Next mixed were 10 parts by weight of the obtained polyamide resin solution, 12 parts by weight of polyethylene glycol like the above, 40 parts by weight of NMP and 38 parts by weight of titanium oxide like the above. The inorganic fine particles were dispersed in the same manner as described above with a paint shaker for six hours, thereby preparing an application liquid W3.

A porous layer was formed on a porous separator substrate in the same manner as described above except for the use of the application liquid W3, thereby producing a separator.

[Evaluation of Application Liquids]

The application liquids prepared in Examples A1 to A3 and Comparative Examples W1 to W3 were evaluated in the following manners.

(Dispersibility in Application Liquid)

Evaluation was made for the dispersibility of inorganic fine particles in each application liquid based on the following criteria.

Good: a state in which no inorganic fine particles have settled out after standing of the application liquid for one day No good: a state in which inorganic fine particles have settled out after standing of the application liquid for one day (Adherence after Film Formation)

Evaluation was made based on the following criteria for the adherence between the porous separator substrate and the porous layer when the porous layer was formed by applying the application liquid on the separator substrate. Note that Comparative Example W3 was not evaluated for the adherence because the dispersibility in the application liquid was no good.

Good: a state in which no delamination is observed in the porous layer after the film formation Partly delaminated: a state in which delamination is observed even in part of the porous layer after the film formation No adhesion: a state in which the porous layer does not adhere to the substrate after the film formation (Delamination in Battery Production Process)

Example A1 and Comparative Example W1 were evaluated for delamination in the battery production process. A separator was interposed between positive and negative electrodes to be hereinafter described, and these components were helically winded up together and pressed down in a flattened form to produce an electrode assembly. Evaluation was made for the state between the separator substrate and the porous layer in the separator of the obtained assembly based on the following criteria.

No delamination: a state in which no delamination is observed in the porous layer in the battery production process Partly delaminated: a state in which delamination is observed even in part of the porous layer in the battery production process The evaluation results of the above examples obtained in the above manners are shown, together with their weight ratios between inorganic fine particles and resin binder and their fluorine contents in resin binder, in TABLE 1.

TABLE 1

| | Resin Binder-to-Inorganic Fine Particle Weight Ratio | Fluorine Content in Resin Binder (wt %) | Dispersibility in Application Liquid | Adherence After Film Formation | Delamination in Battery Production Process |
|---|---|---|---|---|---|
| Ex. A1 | 5:95 | 18 | Good | Good | No Delamination |
| Ex. A2 | 10:90 | 18 | Good | Good | No Delamination |
| Ex. A3 | 15:85 | 18 | Good | Good | No Delamination |
| Comp. Ex. W1 | 4:96 | 18 | Good | Partly Delaminated | Partly Delaminated |
| Comp. Ex. W2 | 3:97 | 18 | Good | No Adhesion | |
| Comp. Ex. W3 | 5:95 | 38 | No Good | | |

As shown in TABLE 1, the separators obtained in Examples A1 to A3 were good in dispersibility in the application liquid, adherence after the film formation and antidelamination in the battery production process. In contrast, in Comparative Example W1, partial delamination was observed between the separator substrate and the porous layer after the film formation and in the battery production process.

In Comparative Example W2, the porous layer did not adhere to the separator substrate after the film formation, whereby the separator could not be formed.

In Comparative Example W3, because the obtained dispersion had a very high thixotropy, a uniformly applied film having a thickness of 4 μm or less after dried could not be formed. In addition, the application liquid was poor in dispersibility and dispersion stability and, therefore, when allowed to stand at room temperature for an hour, inorganic fine particles aggregated and settled out.

As is obvious from the results shown in TABLE 1, it can be seen that the content of the resin binder in the porous layer in the present invention is preferably 5% by weight or more.

It can also be seen that the content of fluorine atoms in the resin binder is preferably 30% by weight or less.

Production of Battery and Continuous Charge Test

Example B1

Production of Positive Electrode

Lithium cobaltate serving as a positive-electrode active material, graphite serving as a conductive carbon material (trade name "SP300", manufactured by Nippon Graphite Industries, Ltd.) and acetylene black were mixed in a mass ratio of 92:3:2. The mixture was put into a mixer (a mechanofusion system "AM-15F" made by Hosokawa Micron Corporation), and mixed while being subjected to compression, impact and shearing action by operating the mixer at 1500 rpm for 10 minutes, thereby obtaining a mixed positive-electrode active material.

Next, the mixed positive-electrode active material and a fluorine-containing resin binder (poly(vinylidene fluoride): PVDF) were incorporated into a solvent of N-methyl-2-pyrrolidone (NMP) to give a mixed positive-electrode active material to binder mass ratio of 97:3, and mixed, thereby preparing a positive electrode mixture slurry.

The obtained positive electrode mixture slurry was applied on both surfaces of a piece of aluminum foil, dried and then rolled, thereby producing a positive electrode.

[Production of Negative Electrode]

Graphite serving as a negative-electrode active material, CMC (carboxymethylcellulose sodium) and SBR (styrene butadiene rubber) were mixed in a mass ratio of 98:1:1 in an aqueous solution. The mixture was applied on both surfaces of a piece of copper foil, dried and rolled, thereby producing a negative electrode.

[Preparation of Nonaqueous Electrolytic Solution]

Ethylene carbonate (EC) and diethyl carbonate (DEC) were mixed to give an EC to DEC volume ratio of 3:7. In the mixed solvent was dissolved $LiPF_6$ to give a concentration of 1 mol per liter of the solvent, thereby preparing a nonaqueous electrolytic solution.

[Production of Nonaqueous Electrolyte Secondary Battery]

A lithium ion secondary battery was produced using the separator produced in Example A1 and the above-described positive electrode, negative electrode and nonaqueous electrolytic solution. Lead terminals were attached to the positive and negative electrodes, and the separator was interposed between the electrodes. Then, these components were helically winded up together and pressed down in a flattened form to produce an electrode assembly. The electrode assembly was placed into a battery outer package made of an aluminum laminate. Into the battery outer package was then poured the nonaqueous electrolytic solution, followed by sealing of the outer package, thereby producing a lithium ion secondary battery. Note that the design capacity of the battery is 780 mAh.

[Continuous Charge Test]
Charge-Discharge Test

The battery was charged at a constant current of 1 It (750 mAh) to a battery voltage of 4.30 V (4.40 V (vs. $Li/Li^+$)) and then charged at a constant battery voltage of 4.30 V (4.40 V (vs. $Li/Li^+$)) to reach 0.05 It (37.5 mAh). After a 10-minute pause, the battery was discharged at a constant current of 1 It (750 mAh) to a battery voltage of 2.75 V (2.85 V (vs. $Li/Li^+$)) and then measured in terms of discharge capacity.

Continuous Charge Test

In a thermostat bath at 60° C., the battery was charged at a constant current of 1 It (750 mAh) to a battery voltage of 4.30 V (4.40 V (vs. $Li/Li^+$)) and then charged at a constant battery voltage of 4.30 V (4.40 V (vs. $Li/Li^+$)) over five days (120 hours) without being cut off depending upon any current value. After cooled down to room temperature, the battery was discharged at a constant current of 1 It (750 mAh) to a battery voltage of 2.75 V (2.85 V (vs. $Li/Li^+$)) and then measured in terms of discharge capacity.

The discharge capacity retention was calculated from the ratio of discharge capacity after the continuous charge test to the discharge capacity before the continuous charge test using the following equation:

$$\text{Discharge Capacity Retention}(\%) = [(\text{Discharge Capacity After Continuous Charge(mAh)})/(\text{Discharge Capacity Before Continuous Charge(mAh)})] \times 100$$

Example B2

A continuous charge test was conducted in the same manner as in Example B1 except that the end-of-charge voltage was set at a battery voltage of 4.32 V (4.42 V (vs. $Li/Li^+$)).

Example B3

A continuous charge test was conducted in the same manner as in Example B1 except that the end-of-charge voltage was set at a battery voltage of 4.34 V (4.44 V (vs. $Li/Li^+$)).

Example B4

A continuous charge test was conducted in the same manner as in Example B1 except that the end-of-charge voltage was set at a battery voltage of 4.36 V (4.46 V (vs. $Li/Li^+$)).

Example B5

A continuous charge test was conducted in the same manner as in Example B1 except that the end-of-charge voltage was set at a battery voltage of 4.38 V (4.48 V (vs. $Li/Li^+$)).

Comparative Example Z1

Synthesis of Resin

In a four-necked flask provided with a condenser and a nitrogen gas inlet, 0.75 mol of trimellitic anhydride, 0.25 mol of isophthalic acid and 1.0 mol of 4,4'-diaminodiphenylmethane diisocyanate were mixed with NMP to give a solid content concentration of 20% by weight, and 0.01 mol of diazabicycloundecene was added as a catalyst to the mixture. The mixture was stirred and allowed to react at 120° C. for four hours.

The solvent-soluble polyamide resin thus obtained had a solid content concentration of 20% by weight and a logarithmic viscosity of 0.8 g/dl. The content of fluorine atoms in the resin was 0% by weight.

A separator was produced in the same manner as in Example A1 except that the resin synthesized in the above manner was used as a resin binder. Then, using the separator, a battery was produced in the same manner as in Example B1. The battery was subjected to a continuous charge test in the same manner as in Example B1.

Comparative Example Z2

A continuous charge test was conducted in the same manner as in Comparative Example Z1 except that the end-of-charge voltage was set at a battery voltage of 4.32 V (4.42 V (vs. Li/Li$^+$)).

Comparative Example Z3

A continuous charge test was conducted in the same manner as in Comparative Example Z1 except that the end-of-charge voltage was set at a battery voltage of 4.34 V (4.44 V (vs. Li/Li$^+$)).

Comparative Example Z4

A continuous charge test was conducted in the same manner as in Comparative Example Z1 except that the end-of-charge voltage was set at a battery voltage of 4.36 V (4.46 V (vs. Li/Li$^+$)).

Comparative Example Z5

A continuous charge test was conducted in the same manner as in Comparative Example Z1 except that the end-of-charge voltage was set at a battery voltage of 4.38 V (4.48 V (vs. Li/Li$^+$)).

Figure 2:
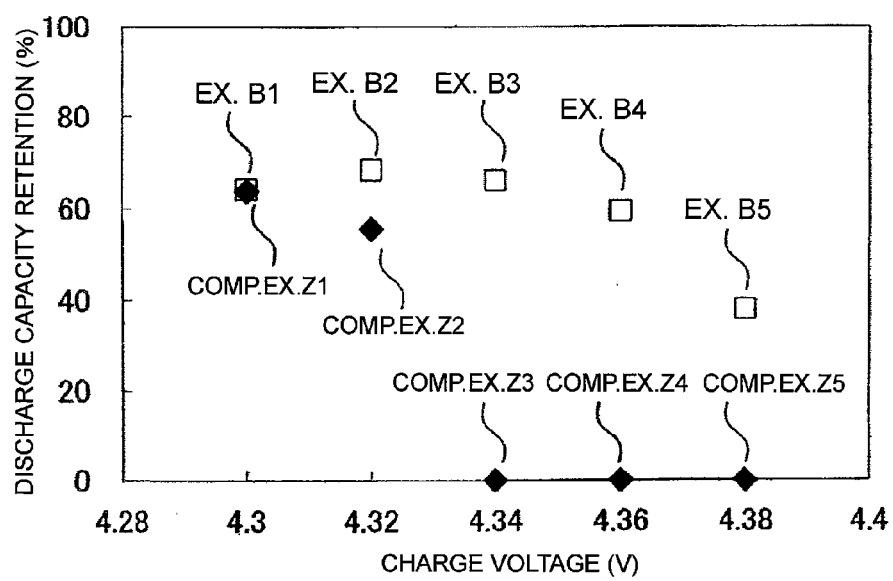
FIG. 2 is a graph showing the relation between charge voltage and discharge capacity retention in Examples and Comparative Examples.

The capacity retentions of Examples B1 to B5 and Comparative Examples Z1 to Z5 are shown in TABLE 2 and FIG. 2.

TABLE 2

|  | Fluorine Content in Resin (wt %) | End-of-Charge Voltage (V) | Discharge Capacity Retention (%) |
| --- | --- | --- | --- |
| Ex. B1 | 18 | 4.30 | 64 |
| Ex. B2 | 18 | 4.32 | 68 |
| Ex. B3 | 18 | 4.34 | 66 |
| Ex. B4 | 18 | 4.36 | 59 |
| Ex. B5 | 18 | 4.38 | 38 |
| Comp. Ex. Z1 | 0 | 4.30 | 64 |
| Comp. Ex. Z2 | 0 | 4.32 | 56 |
| Comp. Ex. Z3 | 0 | 4.34 | 0 |
| Comp. Ex. Z4 | 0 | 4.36 | 0 |
| Comp. Ex. Z5 | 0 | 4.38 | 0 |

As shown in TABLE 2 and FIG. 2, it can be seen that, in Comparative Examples Z1 to Z5 using a resin containing no fluorine as a resin binder, the discharge capacity retention decreased when the end-of-charge voltage was above 4.30 V in battery voltage. In contrast, it can be seen that, in Examples B1 to B5 using a resin containing 18% by weight of fluorine atoms as a resin binder, the decrease in discharge capacity retention could be prevented or reduced even when the end-of-charge voltage was above 4.30 V in battery voltage. It can be assumed that the reason for this is that by containing high-electronegativity fluorine atoms in the molecular chain of the resin binder in the porous layer, the electron density of the resin main chain could be reduced to reduce the electron abstraction reaction due to oxidation and thereby reduce oxidative decomposition.

Therefore, according to the present invention, the nonaqueous electrolyte battery can obtain a good high-temperature charge characteristic.

The invention claimed is:

1. A separator used for a nonaqueous electrolyte battery, wherein
the separator is formed by disposing a porous layer made of inorganic fine particles and a resin binder on a porous separator substrate,
the resin binder is made of at least one resin selected from the group consisting of polyimide resins, polyamide resins and polyamideimide resins and the molecular chain of the resin has a halogen atom content of 10% to 30% by weight,
the content of the resin binder in the porous layer is 5% to 15% by weight.

2. The separator for the nonaqueous electrolyte battery according to claim 1, wherein the halogen atom is fluorine.

3. The separator for the nonaqueous electrolyte battery according to claim 1, wherein the inorganic fine particles are made of at least one selected from the group consisting of alumina and titania.

4. A nonaqueous electrolyte battery comprising: a positive electrode; a negative electrode; the separator according to claim 1 disposed between the positive and negative electrodes; and a nonaqueous electrolyte.

5. The nonaqueous electrolyte battery according to claim 4, wherein the porous layer is disposed on the positive electrode side of the separator.

6. The nonaqueous electrolyte battery according to claim 4, wherein the positive electrode is capable of being charged to above 4.40 V (vs. Li/Li$^+$).

* * * * *